United States Patent [19]

Jalaguier et al.

[11] Patent Number: 5,461,796
[45] Date of Patent: Oct. 31, 1995

[54] GUNSIGHT DEVICE FOR ROTATING-WING AIRCRAFT

[75] Inventors: Jean P. Jalaguier, Vitrolles; Tomasz Krysinski, Marseille, both of France

[73] Assignee: Societe Anonyme dite: Eurocopter France, Marignane Cedex, France

[21] Appl. No.: 31,646

[22] Filed: Mar. 15, 1993

[30] Foreign Application Priority Data

Mar. 24, 1992 [FR] France ................... 92 03529

[51] Int. Cl.⁶ .................................................. F41G 1/46
[52] U.S. Cl. ................... 33/233; 33/252; 33/263; 33/275 R; 244/17.11
[58] Field of Search .................. 33/233, 252, 259, 33/260, 263, 264, 275 R, 229; 416/146 R, 500; 244/17.11

[56] References Cited

U.S. PATENT DOCUMENTS 4,275,992  6/1981  Andrews et al. .

FOREIGN PATENT DOCUMENTS 0064346  11/1982  European Pat. Off. .
2596834  10/1987  France .
2157394  10/1985  United Kingdom .
2256623  1/1994  United Kingdom ............... 244/17.11

*Primary Examiner*—William A. Cuchlinski, Jr.
*Assistant Examiner*—Alvin Wirthlin
*Attorney, Agent, or Firm*—Marshall, O'Toole, Gerstein, Murray & Borun

[57] ABSTRACT

A gunsight device for a rotating-wing aircraft having a hollow rotor hub (1), on which there are radially mounted blades constituting said rotating wing, and which is connected to the main transmission box (2) by a drive shaft coaxial with the rotor of the aircraft. The device includes a nonrotating gunsight head (3) mounted, by means of a support (4), at the free upper end (5a) of a nonrotating mast (5) arranged coaxially inside the hub (1) and the drive shaft of the rotor, the other end (5b) of which mast is fixed into the main transmission box (2), a rolling contact bearing (6) coaxial with the rotor axis being provided between the hub (1) and the mast (5). A suspension (7), intended to filter out the excitations in roll and in pitch to which said gunsight head (3) is subjected, is provided between the base (4a) of the support (4) of the gunsight head (3) and the upper end (5a) of the mast (5).

8 Claims, 3 Drawing Sheets

GUNSIGHT DEVICE FOR ROTATING-WING AIRCRAFT

BACKGROUND OF THE INVENTION

The present invention relates to a gunsight device for a rotating-wing aircraft, and more particularly a helicopter, comprising a hollow rotor hub, on which there are radially mounted blades constituting said rotating wing, and which is connected to the main transmission box of the aircraft by a drive shaft coaxial with the rotor, said gunsight device comprising a non-rotating gunsight head mounted, by means of a support, at the free upper end of a non-rotating mast arranged coaxially inside said hub and said drive shaft of the rotor, the other end of which mast is fixed into the bottom of the main transmission box, a rolling-contact bearing coaxial with the rotor axis being provided between said hub and said mast.

In such a device, it is important dynamically to match the structure for linking the gunsight head onto the hub, which gunsight head is subjected to vibrations due to it being mounted at the top of a mast securely fastened to a rotor hub likely to be subjected to vibrations, and this is in order to obtain a sufficiently low level of vibrations of the gunsight head allowing correct operation of the optoelectronic members which it contains. Up until now, this problem of dynamically matching the structure for linking the gunsight head onto the hub has not been resolved satisfactorily by the softening or stiffening of the components constituting this linking structure.

SUMMARY OF THE INVENTION

The present invention relates to a gunsight device arranged so as to provide better dynamic matching of the structure for linking the gunsight head onto the hub in order to reduce its response to the vibrational excitations generated by the rotating rotor.

For this purpose, the gunsight device, of the type described hereinabove, is noteworthy, according to the invention, in that suspension means, intended to filter out the excitations in roll and in pitch to which said gunsight head is subjected, are provided between the base of the support of the gunsight head and the upper end of the mast.

The level of vibrations transmitted to the gunsight head in roll and in pitch is thus reduced.

Advantageously, said suspension means comprise a swivel in the form of a spherical zone whose center is situated on the axis of the rotor and comprising flexible material fixed between two internal and external reinforcements, said external reinforcement being securely fastened to the base of the support of the gunsight head and said internal reinforcement being securely fastened to the upper end of the mast. The dynamic moments of the gunsight head in roll and in pitch are thus filtered out by shearing the flexible material fixed between two reinforcements made up of spherical zones of the same center.

In the case where it is desirable to increase the angular flexibility of the swivel whilst the latter retains high radial stiffness, the layer of flexible material fixed between the two internal and external reinforcements is of the laminated type and consists of a plurality of layers of flexible material interposed between rigid spherical caps having the same center as the swivel and onto which caps said layers of flexible material are bonded. However, a monolithic layer of constant thickness bonded onto the external and internal surfaces respectively of said reinforcements could also be provided.

In particular, said flexible material may be an elastomer possibly having an energy dissipation capability.

Preferably, said swivel is coupled to a membrane in the form of a circular ring in a plane substantially parallel to the plane of the rotor, fixed, on the one hand, at its internal periphery, to the upper end of the mast and, on the other hand, at its external periphery, to the base of the support of the gunsight head, said membrane being rigid in its own plane in order to transmit the moments about the axis of yaw and the coplanar forces, but, by virtue of its flexibility in flexion, permitting angular oscillations about the axes of roll and of pitch, and the displacements along the axis of yaw permitted by the relative axial flexibility of said swivel. The position of the gunsight head in yaw is therefore transmitted by said membrane, practically without angular deformation.

Advantageously, said membrane is fixed to the upper end of the mast and to the base of the support of the gunsight head by means of said internal and external reinforcements respectively.

In order to increase its flexibility, said membrane may comprise at least one circular rib. Moreover, said membrane is advantageously a metal membrane.

In addition, the device may comprise a stop means consisting of a shoulder arranged at the base of the support of the gunsight head and which comes to press the membrane onto the internal reinforcement of the swivel during angular oscillations of the gunsight head around the axes of roll and of pitch.

DESCRIPTION OF THE DRAWINGS

The figures of the appended drawing will make it easy to understand how the invention may be carried out.

DESCRIPTION OF THE PREFERRED EMBODIMENTS

Figure 1:
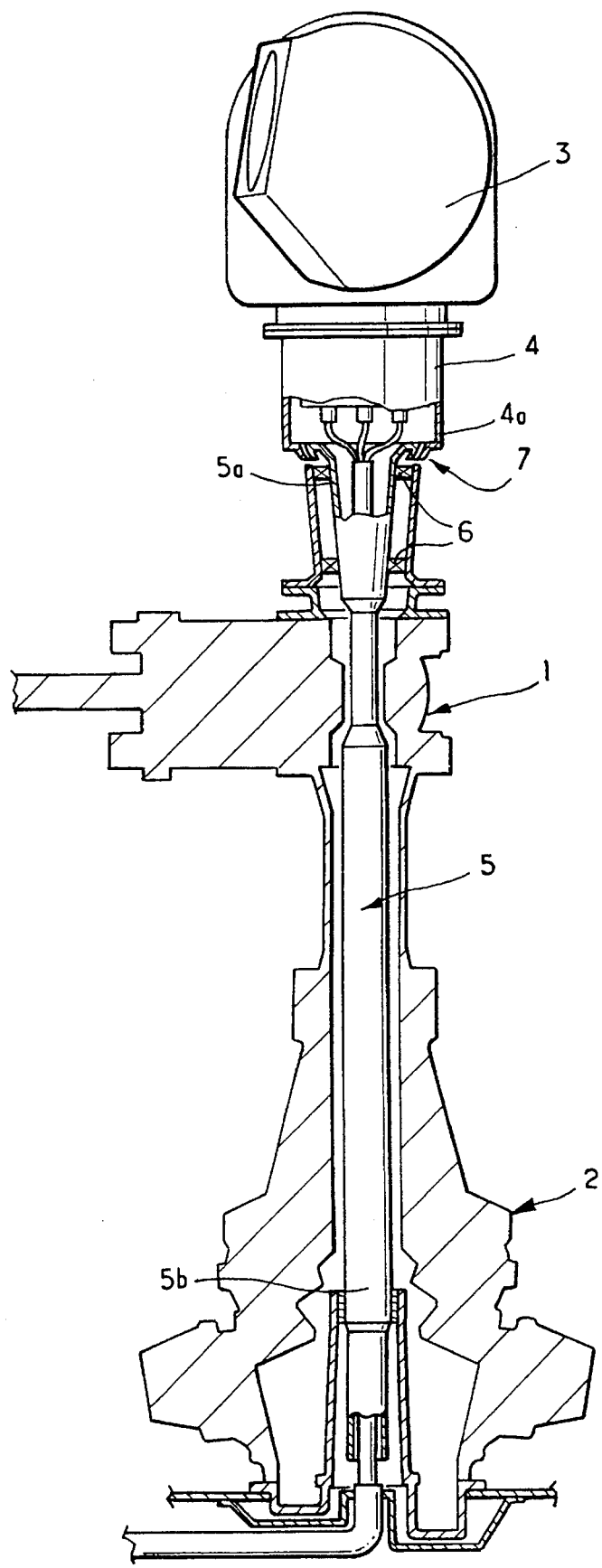
FIG. 1 is a sectional view of a gunsight device for the rotating wing of an aircraft according to the invention.

As can be seen in FIG. 1, the gunsight device is intended to be mounted on the rotor of a rotating-wing aircraft (not shown), such as a helicopter, which has a hollow rotor hub 1, represented very diagrammatically, on which there are radially mounted blades (not shown) and which is supported and rotationally driven by the main transmission box 2 of the aircraft. The gunsight device comprises, as is conventional, a gunsight head 3 mounted, by means of a support 4, at the free upper end 5a of a mast 5 arranged coaxially inside the hub 1, the other end 5b of which mast is fixed into the bottom of the casing of the main transmission box. Moreover, a bearing consisting of two ballbearings 6 is provided between the rotating hub 1 and the non-rotating mast 5.

More particularly, according to the invention, suspension means 7, intended to filter out the excitations in roll (about the axis X—X in FIG. 2) and in pitch (about the axis Y—Y in FIG. 2) to which the gunsight head 3 is subjected, are provided between the base 4a of the support 4 of the gunsight head 3 and the upper end 5a of the mast 5.

Figure 2:
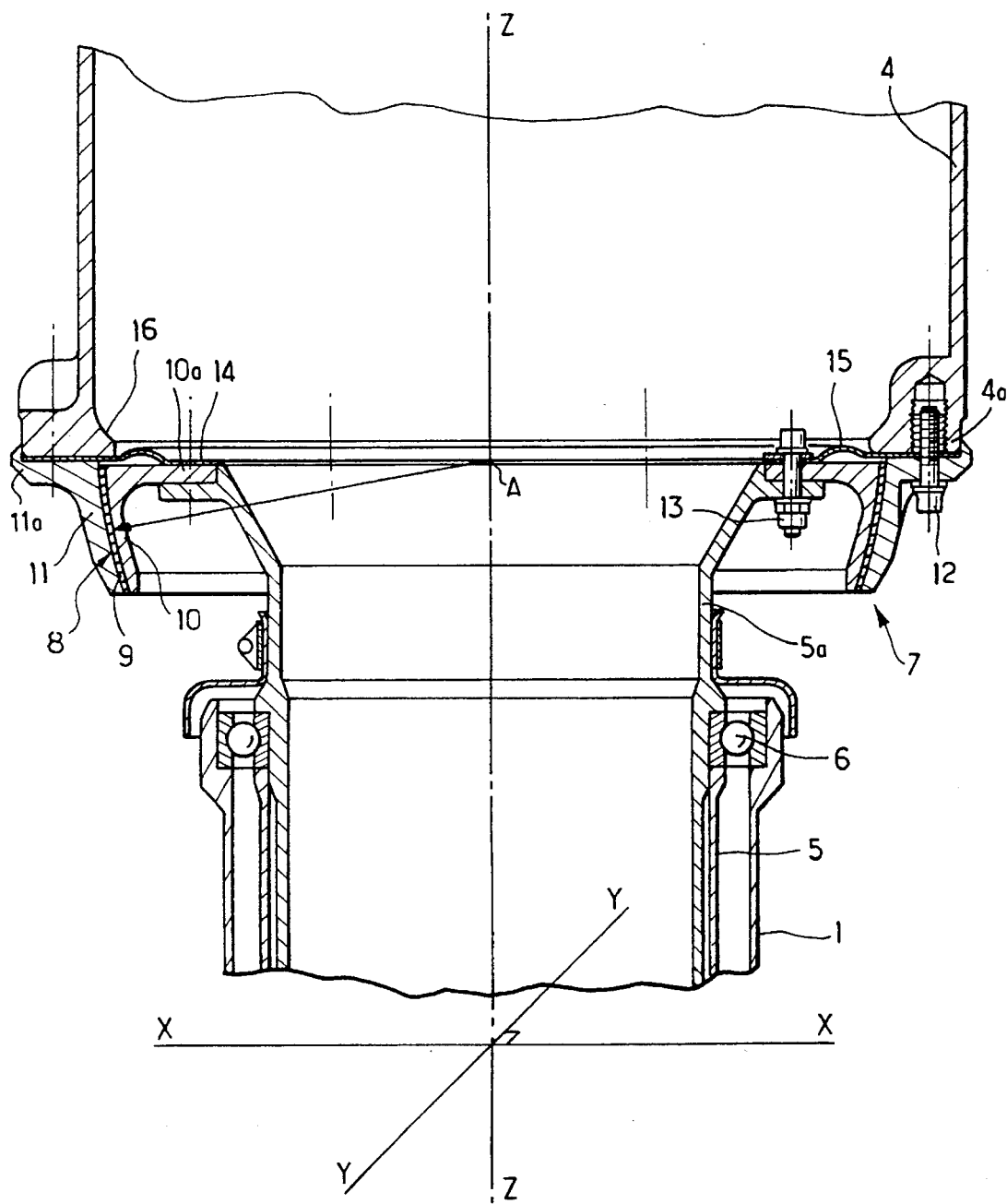
FIG. 2 shows, on a larger scale, the base of the support of the gunsight head and the upper end of the mast, with the suspension means according to the invention.

In FIG. 2, it can be seen that the suspension wings 7 comprise, in this embodiment example, a swivel 8 in the form of a spherical zone of center A located on the rotor axis, said spherical zone being parallel to the plane defined by the axes X—X and Y—Y, and comprising a layer 9 of flexible material, especially an elastomer, possibly having an energy dissipation capability, fixed between two internal 10 and external 11 reinforcements, for example metal ones (it being possible for the elastomer layer to be bonded to the reinforcements 10 and 11 particularly by adhesive bonding or vulcanization).

Figure 3:
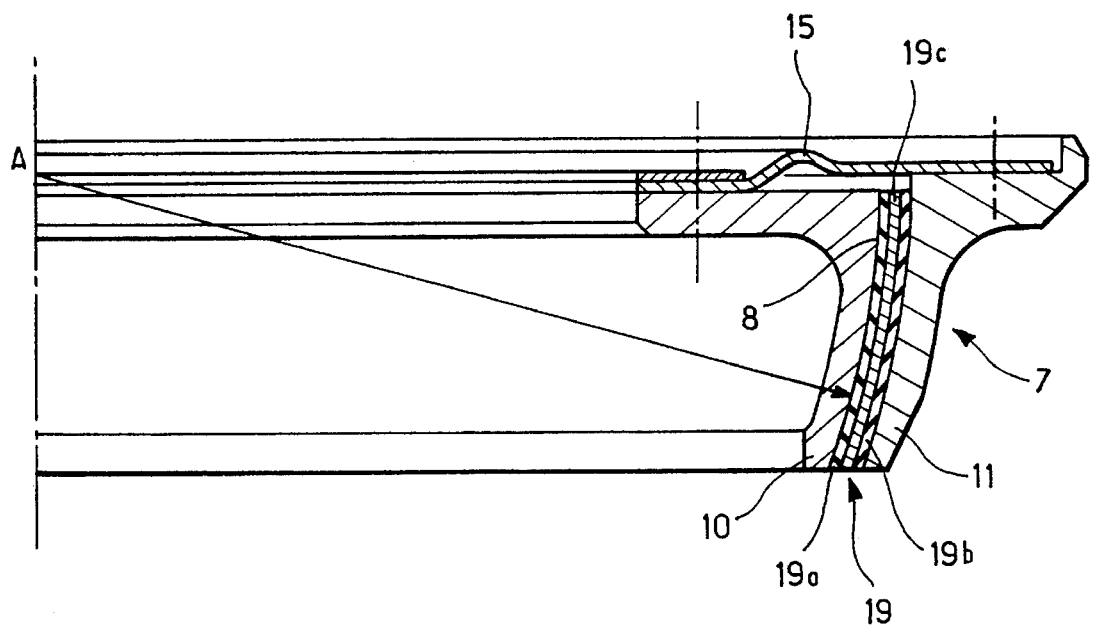
FIG. 3 is a sectional view of a variant of the swivel in the form of a spherical zone according to the invention, in which the flexible material of the swivel is of the laminated type, consisting of two layers of flexible material bonded onto an interposed rigid spherical cap.

In FIG. 3, it can be seen that the suspension means 7 comprise, in this embodiment variant of the swivel 8, a laminated flexible layer 19 bonded to the internal faces of the two internal 10 and external 11 reinforcements, said layer 19 consisting of two layers 19a and 19b of flexible material, particularly an elastomer, arranged on either side of a rigid spherical cap 19c, for example a metal one, to which they are bonded by vulcanization or adhesive bonding.

The external reinforcement 11 is securely fastened to the base 4a of the support 4 of the gunsight head 3, being able to be fixed thereto by screws 12 passing through a circular rim 11a of the reinforcement 11, projecting outwards, it being possible for the screws 12 to be equally distributed angularly about said rim 11a. In a similar fashion, the internal reinforcement 10 is securely fastened to the upper end 5a of the mast 5, it being possible for it to be fixed thereto by screws 13 passing through a circular rim 10a of the reinforcement 10, projecting inwards, it being possible for the screws 13 likewise to be evenly distributed angularly about said rim 10a.

Moreover, the swivel 8 is coupled to a membrane 14, especially a metal one, in the form of a circular rim fixed, on the one hand, at its internal periphery, to the upper end 5a of the mast 5 and, on the other hand, at its external periphery, to the base 4a of the support 4 of the gunsight head 3, the membrane 14 being rigid in its own plane so as to transmit the moments about the axis of yaw Z—Z and the coplanar forces, but, by virtue of its flexibility in flexion (increased by one or more circular ribs 15) permitting angular oscillations about the axes of roll X—X and permitted of pitch Y—Y and, if necessary the displacements about the axis of yaw Z—Z by the axial flexibility of the swivel 8.

As can be seen in FIG. 2, the membrane 14 is fixed to the upper end 5a of the mast 5 and to the base 4a of the support 4 of the gunsight head 3 by means of the internal 10 and external 11 reinforcements, respectively, and this is by virtue of the screws 12 and 13 already mentioned.

Furthermore, the gunsight device according to the invention comprises a stop means, consisting of a shoulder 16 arranged at the base 4a of the support 4 of the gunsight head 3 and which comes to press the membrane 14 onto the internal reinforcement 10 of the swivel 8 during angular oscillations of the gunsight head 3 about the axes of roll X—X and of pitch Y—Y.

Thus, the suspension means according to the invention make it possible to filter out the dynamic moments of the gunsight head in roll and in pitch by shearing the layer or layers of elastomer fixed between two reinforcements consisting of spherical zones of the same center. In contrast, the moment of yaw of the gunsight head is advantageously transmitted from one reinforcement to the other by the membrane, practically without angular deformation.

We claim:

1. A rotating-wing aircraft provided with a gunsight device, said aircraft having axes of yaw, roll, and pitch and a rotor having an axis and a hollow rotor hub, on which there are radially mounted blades, and which is connected to a main transmission box by a drive shaft coaxial with the rotor of the aircraft, said gunsight device comprising a nonrotating gunsight head mounted, by means of a support having a base, at the free upper end of a nonrotating mast arranged coaxially inside said hub and said drive shaft of the rotor, the other end of which mast is fixed into the main transmission box, a rolling-contact bearing coaxial with the rotor axis between said hub and said mast, suspension means, intended to filter out the excitations in roll and in pitch to which said gunsight head is subjected, between the base of the support of the gunsight head and upper end of the mast, said suspension means comprising a swivel in the form of a spherical zone whose center is situated on the axis of the rotor and flexible material fixed between two internal and external reinforcements, said external reinforcement being securely fastened to the base of the support of the gunsight head and said internal reinforcement being securely fastened to the upper end of the mast, said swivel being coupled to a membrane in the form of a circular ring in a plane substantially parallel to the plane of the rotor, fixed at its internal periphery, to the upper end of the mast and at its external periphery, to the base of the support of the gunsight head, said membrane being rigid in its own plane in order to transmit moments about the axis of yaw and coplanar forces, but, by virtue of its flexibility in flexion, permitting angular oscillations about the axes of roll and of pitch, and displacements along the axis of yaw permitted by the relative axial flexibility of said swivel.

2. The device as claimed in claim 1, wherein the flexible material fixed between the two internal and external reinforcements forms a monolithic layer of constant thickness bonded onto the external and internal surfaces respectively of the reinforcements.

3. The device as claimed in claim 1 wherein the flexible material fixed between the two internal and external reinforcements is laminated and comprises a plurality of layers of flexible material of constant thickness, there being interposed between said layers at least one rigid spherical cap having the same center as the swivel and onto the internal and external surfaces of which said layers of flexible material are bonded.

4. The device as claimed in claim 1, wherein said flexible material is an elastomer.

5. The device as claimed in claim 1, wherein said membrane is fixed to the upper end of the mast and to the base of the support of the gunsight head by means of said internal and external reinforcements respectively.

6. The device as claimed in claim 1, wherein said membrane comprises at least one circular rib.

7. The device as claimed in claim 1, wherein said membrane is a metal membrane.

8. The device as claimed in claim 5, further comprising a stop means consisting of a shoulder arranged at the base of the support of the gunsight head and which comes to press the membrane onto the internal reinforcement of the swivel during angular oscillations of the gunsight head around the axes of roll and of pitch.

* * * * *